United States Patent [19]

Herr

[11] Patent Number: 4,686,598
[45] Date of Patent: Aug. 11, 1987

[54] SAFETY CIRCUIT FOR VEHICLE ELECTROMOTIVE WINDOW LIFTS

[75] Inventor: Klaus-Dieter Herr, Edingen, Fed. Rep. of Germany

[73] Assignee: Helmut Hund K.G., Wetzlar-Nauborn, Fed. Rep. of Germany

[21] Appl. No.: 677,475

[22] Filed: Dec. 3, 1984

[30] Foreign Application Priority Data

Dec. 22, 1983 [DE] Fed. Rep. of Germany ....... 3346366

[51] Int. Cl.$^4$ .............................................. H02P 1/22
[52] U.S. Cl. ..................................... 361/31; 318/286; 318/285; 49/28
[58] Field of Search ............... 318/280, 282, 283, 285, 318/286; 361/23, 28, 29, 31; 49/28

[56] References Cited

U.S. PATENT DOCUMENTS

| | | | |
|---|---|---|---|
| 3,891,909 | 7/1975 | Newson | 318/282 |
| 4,272,708 | 6/1981 | Carle et al. | 318/266 |
| 4,562,387 | 12/1985 | Lehnhoff | 318/285 |
| 4,585,981 | 4/1986 | Zintler | 318/282 X |

FOREIGN PATENT DOCUMENTS 2013428 8/1979 United Kingdom ................ 318/265

OTHER PUBLICATIONS

National Semiconductor, COP420R/COP444LR, Piggyback-EPROM Microcontroller, pp. 4-3 to 4-17.

*Primary Examiner*—A. D. Pellinen
*Assistant Examiner*—Howard L. Williams
*Attorney, Agent, or Firm*—Quaintance, Murphy & Presta

[57] ABSTRACT

A safety circuit for a window lift driven by an electric motor is described which causes a reversal in the direction of rotation of the drive motor when the window pane impinges on an impedance in its upward motion. The reversal criterion used is the motor current surge familiar to the state of the art. The circuit of the invention is characterized in that upon actuation of the "close" window key, the drive motor first rotates briefly in the direction of opening and thereby displaces the window pane downwardly, whereupon it is automatically reversed and only then does the pane motion toward the closed position begin. Consequently, the motor start-up peak current decays in that range of displacement of the window pane which is below its initial position, whereby an increase in current (di/dt) after resuming the initial position of the window pane at once causes motor reversal. Thereby, an already wedged hand or the like is prevented from being pressed with the full motor force briefly immediately upon the actuation of the "close" window key.

3 Claims, 5 Drawing Figures

SAFETY CIRCUIT FOR VEHICLE ELECTROMOTIVE WINDOW LIFTS

CROSS REFERENCE TO A RELATED APPLICATION

Applicant claims priority under 35 USC 119 for application No. P 33 46 366.2, filed Dec. 22, 1983, in West Germany.

BACKGROUND OF THE INVENTION

The field of the invention is safety circuits and the present invention is particularly concerned with a safety circuit for a window lift driven by an electric motor, especially in an automobile.

Safety circuits are known to the art for automotive window motors. Their purpose is to prevent unintentional wedging of body parts when the window pane is moved by a motor in the closed direction, i.e., upwardly. Such safety circuits cause a reversal of the drive motor when the window pane encounters an impedance in its upward motion. When this happens, the drive motor uses more electric current than in the ordinary closure process. It is known to use this increment of current as a criterion for reversing the direction of rotation of the motor.

However, current consumption by the motor is by no means always constant even during a normal closing process; instead, it strongly depends on external conditions, for instance outside temperature, degree of wear of the window guides, etc. Accordingly, it is not possible to merely use the absolute current level as the criterion for reversing the motor rotation. Hence, it has already been proposed to make use not of the current level but only a sudden rise in current di/dt as the reversal criterion. The basic concept, for example in West German Application 3,303,590, published Aug. 9, 1984, is that regardless of the actual instantaneous current drain in the motor, a deceleration of the pane in its upward motion, for instance by a caught hand, will always entail an incremental change in current. The occurrence of such a positive di/dt therefore is always a sign of jamming, and it is proper to use this positive di/dt as a reversal criterion.

However, a difficulty is encountered with this approach in that at motor start-up, a current surge also takes place which decays after only a few milliseconds down to the ordinary operational current. This current surge obviously may not be interpreted by the circuit as being a reversal criterion because otherwise it would never be possible to close the window. Therefore, it has already been suggested to use a positive di/dt as a reversal criterion only when simultaneously the motor rpm denoted by n exceeds zero. This additional condition is based on the consideration that the initial current is already decaying when the motor starts rotating. In that case, the slope of the initial current is negative.

This circuit, however, suffers from the drawback that when a hand, a head, or the like is already wedged before the pane starts moving, then this body part is first subjected to the full pressure from the pane edge exerted by the start-up current on the wedged body part. It is only after the start-up current has begun decaying that the positive di/dt can cause reversal of the direction of rotation. When the wedging is such that the motor cannot even start, whereby n=0, then the safety circuit does not become operative in the first place and the hand remains fully wedged.

This drawback assumes practical significance most of all when the pane has been opened only to such an extent that it is still just possible to insert one's fingers between the pane edge and the upper window frame. If now the closing key or switch for the window is actuated, the pane presses against the fingers with full force for a moment before the safety circuit responds, if at all.

SUMMARY OF THE INVENTION

Having in mind the limitations of the prior art, it is an object of the present invention to provide a safety circuit for vehicular window motors wherein the motor's start-up current cannot wedge body parts between the window and the inside of the vehicle's door.

This object is achieved by an improvement in the safety circuit for window lifts in vehicles having therein a drive motor and means for reversing the direction of rotation of the drive motor when there is a sudden increase in the motor current di/dt. The circuit of the present invention is characterized in that upon actuation of the "close window" key, the drive motor first rotates briefly in the direction of opening and thereby displaces the window pane downwardly, whereupon it is automatically reversed and only then does the pane motion toward the closed position begin. Consequently, the motor start-up peak current decays in that range of displacement of the window pane which is below its initial position, whereby any increase in current di/dt after resuming the initial position of the window pane at once causes motor reversal. Thereby, an already wedged hand or the like is prevented from being pressed with the full motor force immediately upon the actuation of the close-window key.

The present invention is based upon the concept that in the circuit, upon actuation of the window closing key or button or the like, the motor first starts in the direction for opening the window, whereby the pane edge is moved away from a body part threatened with wedging and, accordingly, no pressure at all will be initially exerted on this body part.

The circuit further contains elements that after a specified time, for instance after a predetermined downward path of the window pane, the direction of rotation of the motor is automatically reversed, the upward motion of the pane beginning only at that time. It is a special feature of the present invention that the downward path of the pane is to have sufficient length that the positive motor start-up current will have already decayed to the normal current level after the motor has been reversed when the pane returns to its initial position. If then a body part is threatened with wedging and is in the path of the pane, the safety circuit is at once operative when the pane edge impacts the body part.

These features assure that the body part threatened with wedging is in no way first clamped by the force of the start-up current before the safety circuit responds. The drawback of the safety circuit of the state of the art is thereby overcome by the safety circuit of the present invention.

The safety circuit of the present invention, however, just as in the state of the art, also makes use of a short-term rise in motor current, that is of a positive di/dt as the reversing criterion for the drive motor. Therefore, steps must also be taken in the safety circuit of the present invention to disable the positive di/dt slope of the start-up current as a reversal criterion.

According to a further concept of the present invention, this is done either by integrating a component into the circuit permitting the analysis of a current surge for purposes of motor reversal only after a given time past the motor start-up, i.e., a time-delay component, or else by the circuit containing a component permitting analysis of a current surge for purposes of motor reversal only after the positive current undergoes the first negative di/dt. This component uses the first negative di/dt as the trigger slope.

BRIEF DESCRIPTION OF THE DRAWINGS

The drawings further illustrate and discuss embodiments of the present invention, wherein.

DESCRIPTION OF THE PREFERRED EMBODIMENTS

Figure 1:
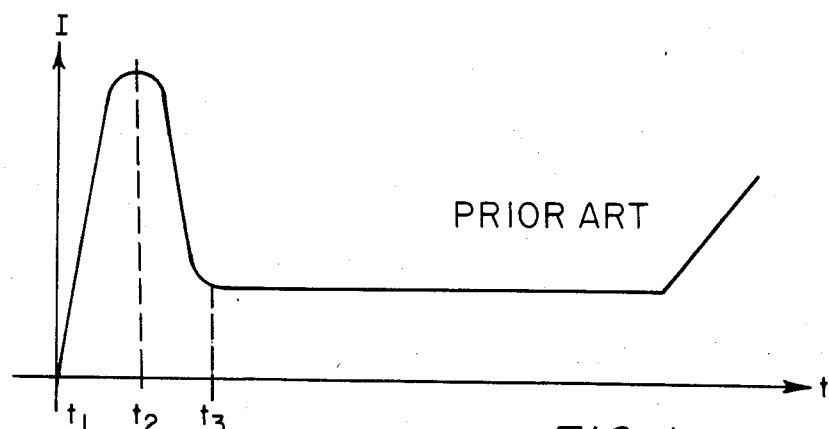
FIG. 1 is a graphical representation of a current-time curve of a safety circuit of the state of the art.

FIG. 1 shows the current in the drive motor as a function of time for a safety circuit of the state of the art. At $t_1$, the motor circuit is closed. Thereupon, the current surges to a peak at time $t_2$. A positive di/dt is present but this first positive di/dt is not analyzed as a motor reversal criterion because between $t_1$ and $t_2$ the rpm n is still zero. As the motor starts turning, the current drops, that is, one has reached the time interval between $t_2$ and $t_3$. Each subsequent di/dt then is actually analyzed as being a motor reversal criterion. The drawbacks of such a circuit concerning short-term wedging of a body part already have been comprehensively discussed in the Background of the Invention.

Figure 2:
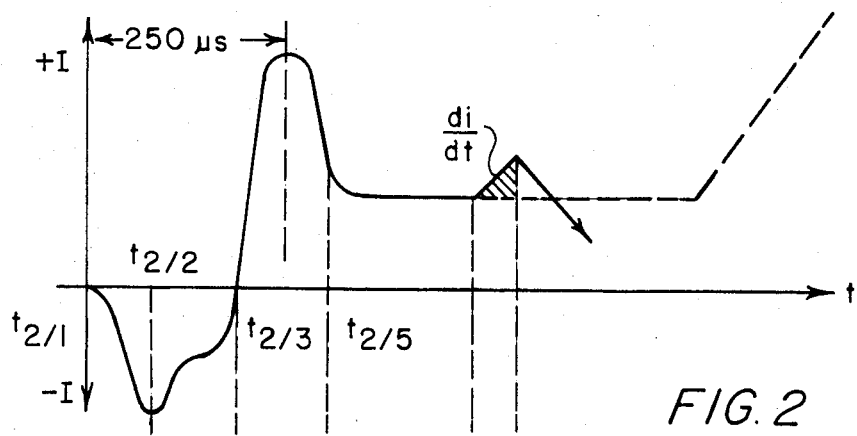
FIG. 2 is a graphical representation of a current-time curve of the safety circuit of the present invention.

FIG. 2, in comparison, shows the current of the safety circuit of the invention. At $t_{2/1}$, the motor circuit, i.e., the actuation knob, is closed and one can see that initially the current in the motor is in the opposite direction. This current reaches a negative trough at $t_{2/2}$. As will be noted by comparing the associated path-time curve of the displacement of the window in FIG. 3, the motor up to time $t_{2/2}$ as yet has not moved. However, it starts at this time $t_{2/2}$ and moves the pane in the open direction. At the same time, the direction of the current in the motor is automatically reversed at $t_{2/2}$. Therefore, from $t_{2/2}$ the current in the motor increases positively while still being absolutely negative until $t_{2/3}$. Accordingly, the motor until $t_{2/3}$ keeps rotating toward the open position and within this range displaces the window pane downward. The pane comes to its lowest point at $t_{2/3}$.

The current is in the positive range from the time $t_{2/3}$ on. This means that the motor reverses direction of rotation at $t_{2/3}$ and the window pane reverses its motion. The pane moves up again beyond $t_{2/3}$ and at first at somewhat higher speed because the motor start-up current rises at the beginning of rotation toward the closing position to the peak $t_{2/4}$. This surge peak then decays and at about $t_{2/5}$ is of normal current level. Henceforth, any sudden rise in current, that is any positive di/dt triggers a reversal of the drive motor.

The entire circuit is constructed in such a way that the window pane just about reaches its initial position again when the current assumes its normal level at $t_{2/5}$. If now a hand is still at this initial position, there is at once di/dt and the motor, and hence the pane, is switched for downward motion.

Figure 3:
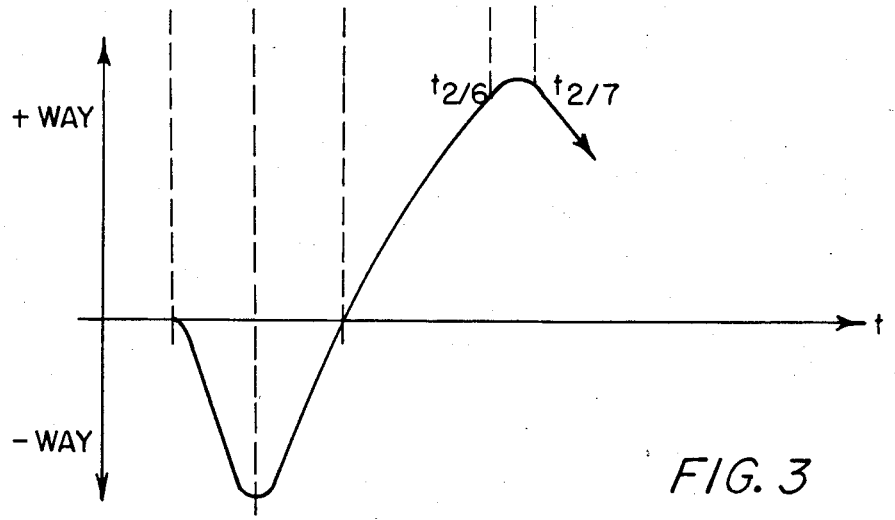
FIG. 3 is a graphical representation of the path-time curve corresponding to FIG. 2.

FIGS. 2 and 3 clearly show that upon actuating the "close" key, the window first moves in the direction of opening (down) and rises only after a short descent. It is important in this respect that when the pane resumes its initial position, the current in the motor decays to its normal operational level, so that upon upward motion of the window pane from that position, the safety circuit is immediately effective when an impedance is in the way.

The safety circuit of the present invention, however, also assures that the first current surge in the range between $t_{2/2}$ and $t_{2/4}$ does not prematurely reverse the drive motor. This is implemented for instance by the circuit containing a time-delay which permits analyzing a positive di/dt for purposes of motor reversal only after a specified time following the key actuation. This time interval is set in the light of an empirical value and, for instance, it is 250 microseconds, as indicated in FIG. 2.

The circuit may also comprise a component permitting a positive di/dt as the reversal criterion only after there has been a first negative di/dt, that is a component which analyzes the falling slope of the start-up current as the trigger slope.

In FIG. 2, a current surge, i.e., a positive di/dt is shown between $t_{2/6}$ and $t_{2/7}$. A corresponding reversal of the direction of motion of the window pane is shown in FIG. 3.

The dashed line in FIG. 2 indicates the normal current when a window is closed. During the displacement of the window pane, an approximately constant amperage is present in the motor. When, however, the window pane enters the upper window frame at the end of the motion, the current rises substantially. It is known in the state of the art to shut off the safety circuit briefly beforehand to prevent the pane from descending again.

Figure 4:
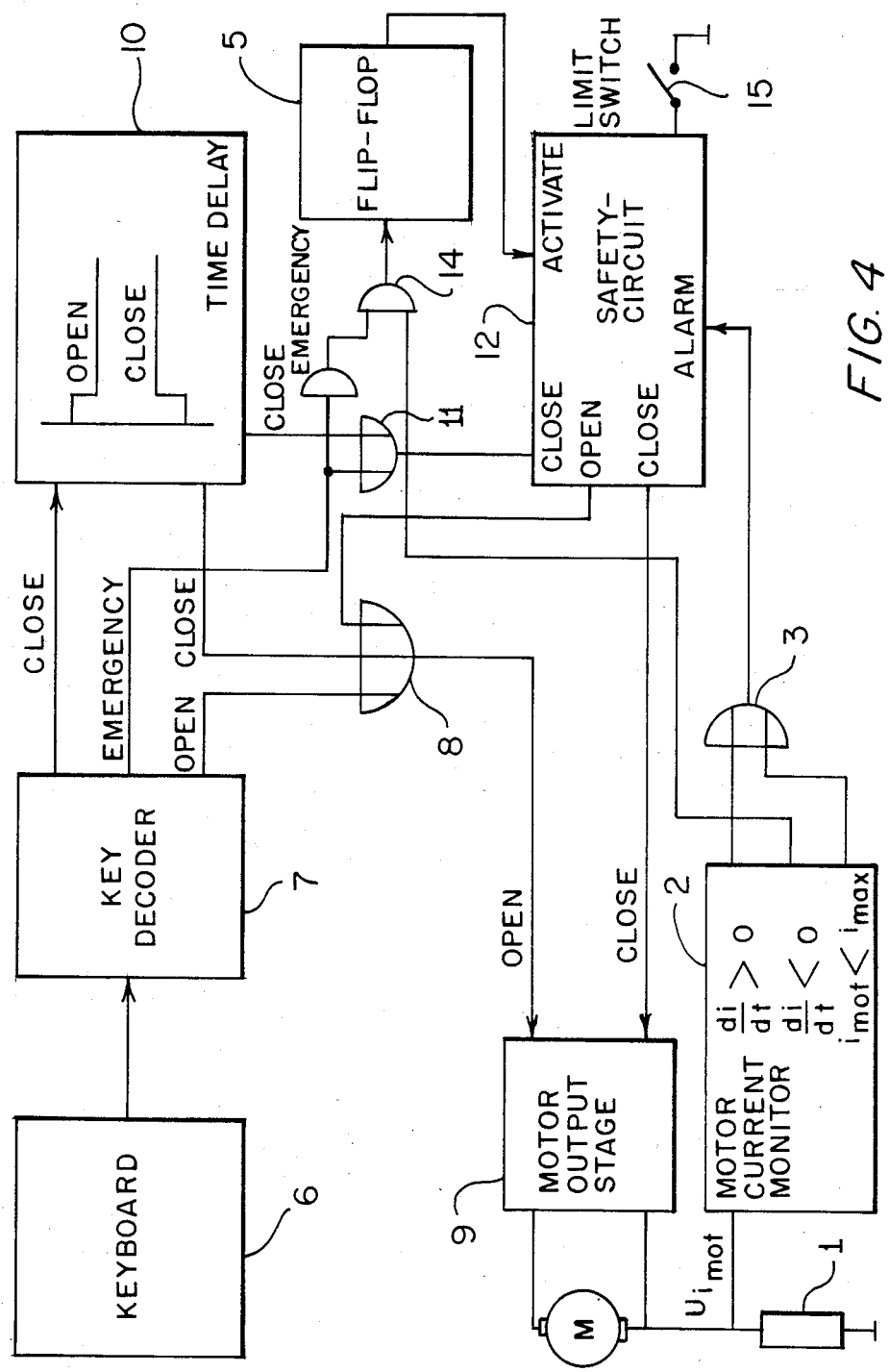
FIG. 4 is a block diagram of the circuit of the present invention constructed from discrete components.

In the circuit assembly of FIG. 4, the motor is designated by M. It is in series with the measurement resistor 1. The voltage difference across the resistor is fed to an appropriate electronic means operating as the motor current monitor 2 and evaluates whether a positive or a negative di/dt is present, or whether a maximum current $i_{max}$ is being exceeded. The signal emitted by the monitor 2 is fed to an OR gate 3 when di/dt > 0 or when $i_{mot} > i_{max}$, whereas this signal is fed through an AND gate 14 to a flip-flop 5 if di/dt < 0.

The keyboard 6 is followed by a key decoder 7 emitting a signal according to key actuation. This signal is, for instance, the "open" signal. Such an "open" signal is fed through an OR gate 8 directly to the motor output stage 9 which starts up the motor. In the present consideration, this "open" signal, however, is of only moderate interest and it has been cited only for the sake of completeness.

When, on the other hand, the decoder 7 ascertains that the key for "close" is pressed, it feeds this signal to a time delay 10. This time delay 10 first emits, for a predetermined time, an "open" signal through the OR gate 8 to the motor output stage, whereby the motor starts up to open the pane. This is the $t_{2/1} - t_{2/2}$ interval of FIG. 2.

At time $t_{2/2}$, the time delay 10 switches and issues the "close" signal through an OR gate 11 to the actual safety circuit 12. From this safety circuit the "close" signal then passes directly to the motor output stage 9.

Two further components, however, are connected to the safety circuit 12, namely the flip flop 5 and the OR gate 3. Both components are controlled by the motor monitor 2. If now this monitor detects that $di/dt<0$, then it emits a signal through the AND gate 14 to the flip flop 5 which, in turn, activates the safety circuit 12. This process takes place within the time interval $t_{2/4}-t_{2/5}$ of FIG. 2. The negative $di/dt$ acts as the trigger slope to switch on the safety circuit.

If, following this actuation of the safety circuit, the motor current monitor 2 detects that $di/dt>0$, then this signal is fed through the OR gate 3 to the safety circuit where it is interpreted as an alarm signal, i.e., the safety circuit emits an "open" signal through the OR gate 8 to the motor output stage 9. This is the safety function proper of the safety circuit, namely automatically opening, i.e., moving the window pane down when a body part or the like is wedged by the pane and hence causes $di/dt>0$.

Moreover, an emergency circuit is also provided which passes through the flip flop 5 and the OR gate 11. When the emergency key is depressed, the safety circuit is disabled and the motor output stage 9 receives the command to let the motor run toward the "close" position at $i_{max}$.

The limit switch 15 is closed and disables the safety circuit shortly before the pane moves against the upper window frame.

Figure 5:
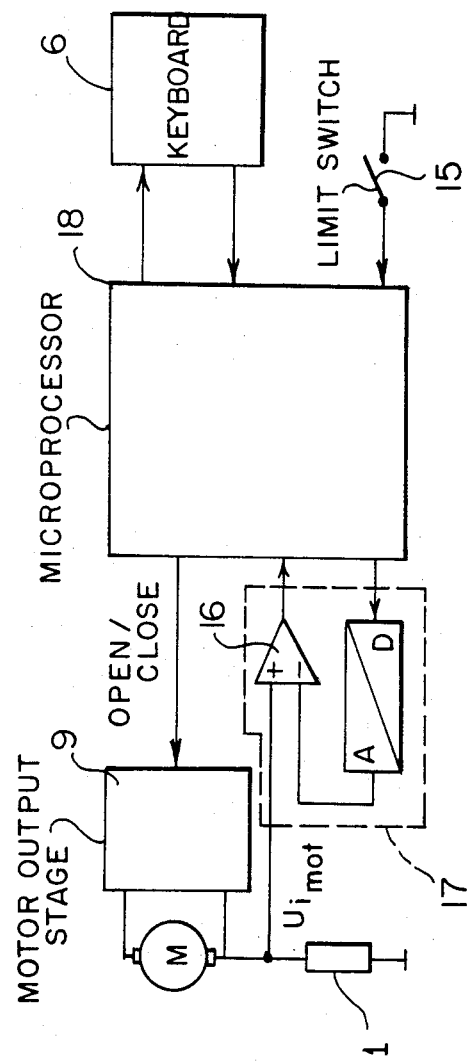
FIG. 5 is a block diagram of the circuit of the present invention constructed with a microprocessor.

The microprocessor circuit of FIG. 5 also shows the motor M in the circuit with the measuring resistor 1. Its voltage difference is analogue to the motor current and fed to a comparator 16. A digital analog converter 17 is connected to the comparator and is controlled by the microprocessor 18.

Furthermore, the circuit includes the keyboard 6, the motor output stage 9 and the limit switch 15.

The voltage across the measuring resistor 1 is a measure of the motor current. By means of the analog digital conversion, the processor 18 ascertains the instantaneous motor current which it monitors. If it ascertains a positive $di/dt$ or the motor current being exceeded, the processor 18 will reverse the pane motion.

The microprocessor program contains the functions for detecting the direction of motion from the keyboard, the suppression of the start-up current surge, etc.

As an illustration of the microprocessor 18 available commercially, there is the type "COP 420 R" as manufactured and sold by Messrs. National Semiconductor Corporation.

What I claim is:

1. In a safety circuit having therein a drive motor and means reversing the direction of rotation of said drive motor when there is a sudden increase in the motor current, said drive motor actuating a window lift and a window attached to said lift, the improvement comprising:

means rotating said drive motor through a predetermined period of time in a window-open direction upon actuation of a window-close switch and generation of a start-up current, thereby displacing said window through a predetermined distance in said window-open direction;

means reversing the direction of rotation of said drive motor at the end of said predetermined period of time, thereby displacing said window in a window-close direction;

means adjusting said predetermined period of time through which said drive motor rotates first in said window-open direction and thereafter in said window-close direction to such a length that the motor current has already assumed its normal value when the window has again reached a starting position; and means disconnecting said means rotating after switching the motor operation at the beginning of the movement of said window in said window-close direction.

2. The safety circuit of claim 1, wherein said means disconnecting is a time-delay means permitting analysis of a positive $di/dt$ only upon the lapse of a predetermined time interval.

3. The safety circuit of claim 1, wherein said means disconnecting is a circuit element analyzing a second negative $di/dt$ of said start-up current as a trigger slope and permitting the analysis of a positive $di/dt$ in relation to said trigger slope.

* * * * *